United States Patent
Hasegawa

(10) Patent No.: US 7,726,508 B2
(45) Date of Patent: Jun. 1, 2010

(54) SAFETY CAP FOR A PRESSURE RELEASE VALVE OF A PRESSURE COOKER AND A PRESSURE COOKER USING THE SAME

(76) Inventor: Tom Hiroshi Hasegawa, 1467 W. 178th St., Suite 301, Gardena, CA (US) 90248

(*) Notice: Subject to any disclaimer, the term of this patent is extended or adjusted under 35 U.S.C. 154(b) by 877 days.

(21) Appl. No.: 10/741,744

(22) Filed: Dec. 19, 2003

(65) Prior Publication Data

US 2004/0129705 A1 Jul. 8, 2004

Related U.S. Application Data

(63) Continuation-in-part of application No. 10/334,083, filed on Dec. 30, 2002, now abandoned.

(51) Int. Cl.
*B65D 51/16* (2006.01)

(52) U.S. Cl. .................. 220/372; 220/373; 220/912; 220/316; 220/731

(58) Field of Classification Search ............... 220/316, 220/370, 372, 373, 731, 912; 210/499
See application file for complete search history.

(56) References Cited

U.S. PATENT DOCUMENTS

| | | | |
|---|---|---|---|
| 1,584,516 A | | 5/1926 | Demuth |
| 2,371,895 A | * | 3/1945 | Kingman ............... 210/457 |
| 2,860,811 A | * | 11/1958 | Hessler ............... 220/203.29 |
| 4,143,787 A | | 3/1979 | Walker |
| 4,353,318 A | * | 10/1982 | Williams ............... 114/211 |
| 4,469,237 A | * | 9/1984 | Zerdian et al. ......... 220/203.09 |
| 4,534,485 A | | 8/1985 | Subramanian |
| 4,961,849 A | * | 10/1990 | Hull et al. ............... 210/169 |
| 5,011,035 A | | 4/1991 | Subramanian |
| 5,048,400 A | | 9/1991 | Ueda et al. |
| 6,488,846 B1 | * | 12/2002 | Marangi ............... 210/232 |

FOREIGN PATENT DOCUMENTS

| | | |
|---|---|---|
| CN | 86200398 | 10/1986 |
| CN | 2050294 | 1/1990 |
| CN | 2060321 | 8/1990 |
| CN | 2330282 | 7/1999 |
| FR | 632000 | 12/1927 |
| FR | 61654 | 5/1955 |
| FR | 61959 | 6/1955 |
| FR | 2662593 | 12/1991 |
| TW | 425907 | 11/1989 |

* cited by examiner

*Primary Examiner*—Anthony Stashick
*Assistant Examiner*—James N Smalley
(74) *Attorney, Agent, or Firm*—William L. Androlia; H. Henry Koda

(57) ABSTRACT

A safety cap made of a mesh casing body and attachment frame and attached by snap-fitting or screw engagement to the pressure release valve of a pressure cooker or to the inner surface of the lid of the cooker so as to cover the pressure release valve, thus allowing no food particles to reach the pressure release valve and preventing the pressure release valve from being clogged.

2 Claims, 5 Drawing Sheets

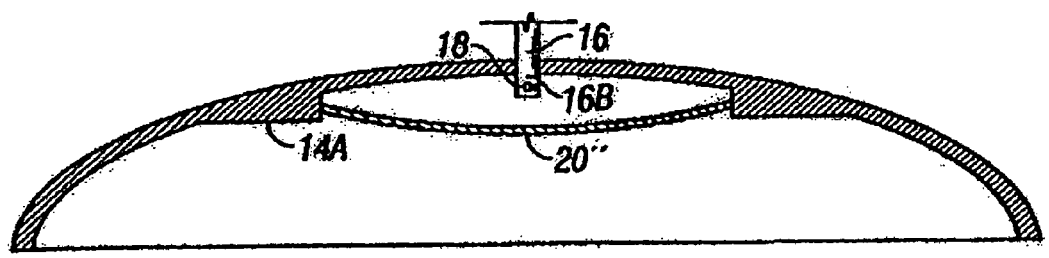
FIG. 6
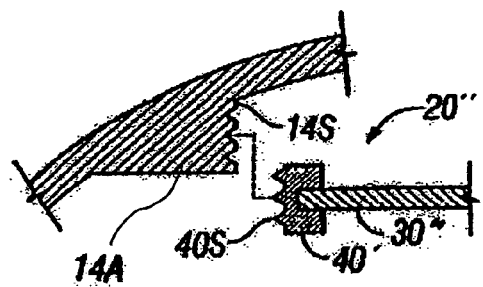 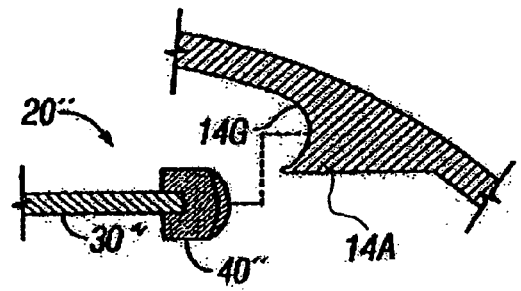
FIG. 7   FIG. 8

SAFETY CAP FOR A PRESSURE RELEASE VALVE OF A PRESSURE COOKER AND A PRESSURE COOKER USING THE SAME

BACKGROUND OF THE INVENTION

1. Field of the Invention

The present invention relates to a pressure cooker and more specifically, to a pressure cooker with a safety cap that covers and protects the pressure release valve.

2. Prior Art

A pressure cooker is a cooking utensil (pot) that utilizes high-temperature and high-pressure steam to cook food inside the pot. The pot and its lid are designed to create an airtight space inside the pot. When the pot is heated, the air inside expands. The expanding air inside the pot is unable to escape, so the atmospheric pressure within the pot increases. As the atmospheric pressure increases, the boiling point of water also increases. Thus, a pressure cooker enables the water or moisture in the pot to become hotter than it would under normal atmospheric pressure.

With a conventional cooking pot, the water inside a pot turns into steam at around 100° C. (212° F.). The steam freely escapes the pot, leaving the atmospheric pressure within the pot close to normal and the temperature close to 100° C. Consequently, a large portion of the heating energy applied to the pot is wasted in warming the surrounding air.

In addition to creating a high-pressure environment within a pot, a pressure cooker also makes the water in a pot, in addition to the moisture within food, hotter than 100° C. and this impacts cooking in three ways. First, food cooks much faster in a high-pressure and high-temperature environment, and requires far less cooking or heating time. The cooking time is shortened to one-third or one-fourth of the time required for a conventional cooking pot. Second, the decreased cooking time and trapped steam results in greater energy efficiency. A pressure cooker generally requires only one-fourth to one-third of the energy of a conventional cooking pot. Third, high-temperature and high-pressure cooking significantly improves cooking in high altitudes and in cold climates.

Unfortunately, there is an omnipresent risk of explosion caused by too much pressure inside the pot. This risk is very real because a pressure cooker prohibits the free circulation of air between the interior and the exterior of the pot and cooks food under high-pressure and high-temperature conditions. Present pressure cooker manufacturers alleviate this risk in many ways, including: using sturdier materials to construct pots; utilizing a timer to control the length of heating time; installing a pressure gauge to monitor the atmospheric pressure inside; and installing a pressure release valve, which is the most widely used method.

A pressure release valve is a device that is physically attached to a pressure cooker. Its function is to release the pressurized air in a pot when the atmospheric pressure within the pot exceeds a pre-set point. The valve is usually installed in the pressure cooker lid. The interior portion of the valve is shaped like a pipe, and it has a closed end surrounded by four or five air intake apertures of 1 mm to 2 mm in diameter. The exterior portion of the valve is an air release nozzle. This nozzle is kept closed by the pressure of a weight device or a spring mechanism. When the pressure of the air or steam coming into the valve becomes greater than the pressure that keeps the nozzle closed, the valve opens and releases the inside air, which reduces the atmospheric pressure within the pressure cooker.

While this type of safety device is very widely used, it is flawed in two major ways. First, the air intake apertures are easily clogged. When this occurs, the expanding air inside the pot has no means of release and the atmospheric pressure rises, which significantly increases the risk of explosion. The air intake apertures may be clogged by foods while cooking or by inadequate cleaning.

Second, putting aside the safety function that the valve actually provides, the valve's exterior appearance does not give the user an adequate sense of safety in using the pressure cooker. When a user sees only four or five very small clog-prone apertures (the number and size of the apertures vary according to size and type of the pressure cooker), he or she may feel more anxious than assured of the valve's safety. As if to increase this insecurity, the owner's manual accompanying the pressure cooker, in addition to other literature, repeatedly warn users about the importance of proper maintenance of the valve. While many consumers may realize the merits of a pressure cooker, unfortunately, they largely remain potential users.

SUMMARY OF THE INVENTION

The two objectives of the present invention are to provide a significantly safer pressure cooker by protecting the pressure release valve so that it will not clog, thereby preventing explosions caused by clogging, and to eliminate a user's insecurity regarding the proper functioning of the pressure release valve.

The basic idea of the present invention is to prevent food particles from reaching the pressure release valve during cooking, so that the air intake apertures cannot be clogged.

The objectives are accomplished by an innovative and unique device specifically designed for a pressure cooker, which protects air intake apertures and prevent clogging.

More specifically, a wavy mesh-like or perforated surface structure (hereinafter referred to as "safety cap") is installed around the pressure release valve of the pressure cooker. By design, the safety cap has numerous holes or openings that are slightly smaller or equal to the size of the air intake apertures. During cooking, the hot air or pressure inside the pressure cooker is allowed to escape when it is appropriate, while the safety cap prevents food particles that may clog the air intake apertures of a pressure release valve from passing through the safety cap. The sheer number of holes and the size of those holes in the surface of the safety cap greatly improves the means by which steam may escape while preventing food from reaching the air intake apertures entirely, thus protecting the pressure release valve so that it may serve its safety function.

BRIEF DESCRIPTION OF THE DRAWINGS

FIG. 6 shows in partial cross section how the safety cap attaches to the pressure cooker lid in the present invention;

FIG. 7 shows in cross section the detail of how the screw safety cap attaches to the pressure cooker lid in the present invention;

FIG. 8 shows in cross section the detail of how the snap-fit safety cap attaches to the pressure cooker lid in the present invention;

DETAILED DESCRIPTION OF THE INVENTION

The safety cap of the present invention (See FIG. 1) is used in an ordinary pressure cooker 10 that includes a pot 12, a lid 14 and a pressure regulator or pressure release valve 16 that releases the pressure (heated or hot air) inside the pot 12 during cooking. The pressure release valve 16 is provided at the center of the lid 14 and has a pressure release passage (not shown) therein.

Figure 1:
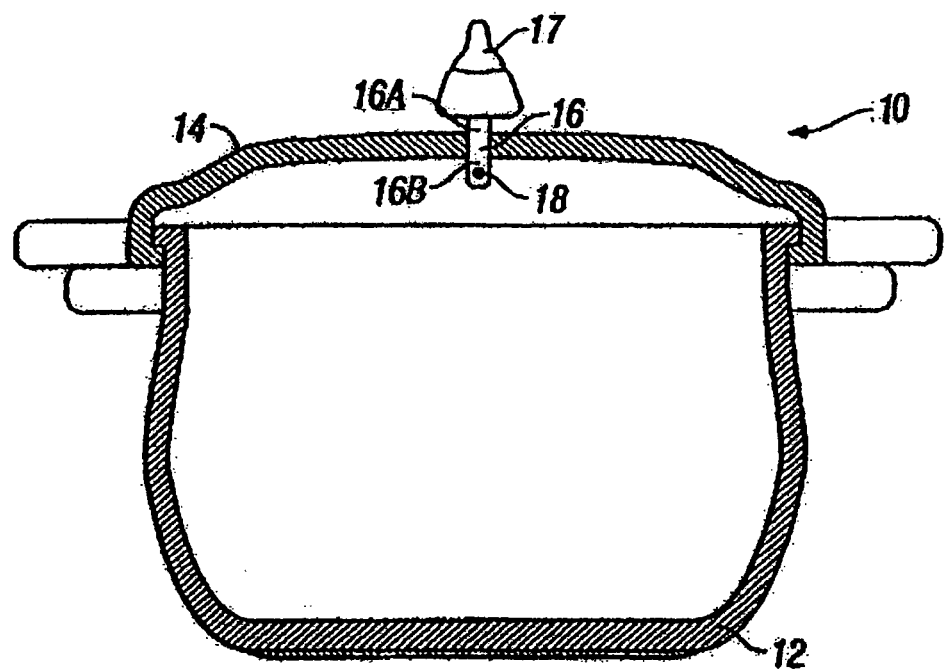
FIG. 1 illustrates a pressure cooker to which the present invention is applied.

More specifically, the pressure release valve 16 comprises an upper portion 16A, which is exposed outside the lid 14 and has a pressure regulation weight 17, and a lower portion 16B, which is located under the lid 14 and is covered by a safety cap 20 described below. The lower portion 16B of the pressure release valve 16 is formed with air intake apertures 18 (for instance, one aperture is opened in the lower end surface of the pressure release valve 16, and four apertures are opened in the peripheral area near the lower end of the pressure release valve 16; however, only one aperture is shown in FIG. 1). These air intake apertures 18 communicate with, via the pressure release passage (not shown), an air release nozzle (not shown) opened in the upper portion 16A of the pressure release valve 16. Thus, heated air or the pressure inside the pressure cooker 10 during cooking is released through the air intake apertures 18 and the pressure release aperture.

Figure 2:
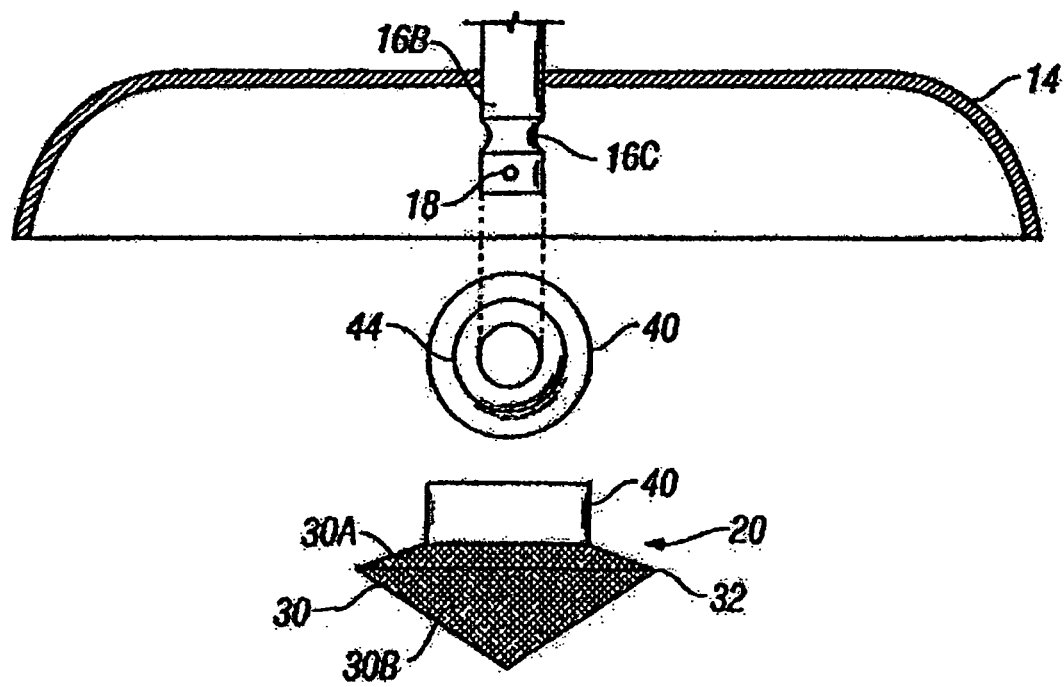
FIG. 2 shows in partial cross section how the snap-fit safety cap attaches using elastic material in the present invention.

As seen in FIG. 2, the safety cap 20 is comprised of a mesh casing body 30 with numerous openings and an attachment frame 40 that is fixed to the top of mesh casing body 30. The attachment frame 40 is located at the center of the top surface of the mesh casing body 30. The mesh casing body 30 and the attachment frame 40 are both made of heat resistant material such as metal (e.g. stainless steel) and/or heat-resistant plastics that can withstand the high-temperature and high-pressure inside the pressure cooker 10. They are also formed rigid to avoid deformation that may be caused by high heat and high pressure during cooking. Each of the openings in the mesh casing body 30 is equal to or smaller than the air intake apertures 18 of the pressure release valve 16.

The mesh casing body 30 is comprised of a shallow top section 30A, which is in a conical shape and a relatively deep main section 30B, which is in a reversed conical shape. The lower edge of the top section 30A and the upper edge of the main section 30B are connected and form the mesh casing body 30 with a circumferential ridge 32. The mesh casing body 30 has a diameter that is three times larger than that of the pressure release valve 16 of the pressure cooker 10. In addition, the depth or the height of the mesh casing body 30 is designed to be greater than the length of the lower portion 16B of the pressure release valve 16. As a result, when the safety cap 20 is set so that it covers the pressure release valve 16, there is a space between the inner surface of the mesh casing body 30 and the outer surface of the pressure release valve 16.

The attachment frame 40 of a shallow, hollow cylinder shape is provided with an elastic ring 44 in its interior. The inner diameter of the elastic ring 44 is the same as (or slightly smaller than) the outer diameter of the lower portion 16B of the pressure release valve 16 of the pressure cooker 10. The elastic ring 44 is made of elastic material and the rest of the attachment frame 40 is made of rubber or another heat resistant elastic material.

The safety cap 20 is attached to the pressure release valve 16 by pushing or sliding on the attachment frame 40 of the safety cap 20 to the lower portion 16B of the pressure release valve 16. The attachment frame 40 has the elastic ring 44 inside it, so that the attachment frame 40 fits on the lower portion 16B of the pressure release valve 16.

A circumferential groove 16C on the outer surface of the pressure release valve 16 ensures that the attachment frame 40 itself and the elastic ring 44 are snugly fitted in this groove 16C. The result is that the safety cap 20 is securely attached to the pressure release valve 16.

Great care should be taken when attaching the safety cap 20 to the pressure release valve 16. The attachment frame 40 (or the elastic ring 44) should not cover or close the pressure intake apertures 18 of the pressure release valve 16.

With the safety cap 20 attached to the pressure release valve 16, the mesh casing body 30 of the safety cap 20 catches fine food particles that may block the air intake apertures 18 during cooking. Thus, the air intake apertures 18 of the pressure release valve 16 are prevented from clogging by food particles. The surface area of the safety cap 20 is substantially greater than the lower portion 16B of the pressure release valve 16 and in particular, greater than the air intake apertures 18. Therefore, it is nearly impossible for all the openings of the safety cap 20 to be clogged entirely since cooking will normally be over before the entire surface of the safety cap 20 is covered by food particles. Because the safety cap 20 is rigid and because it covers the air intake apertures 18, the pressure release valve is prevented from clogging.

Figure 3:
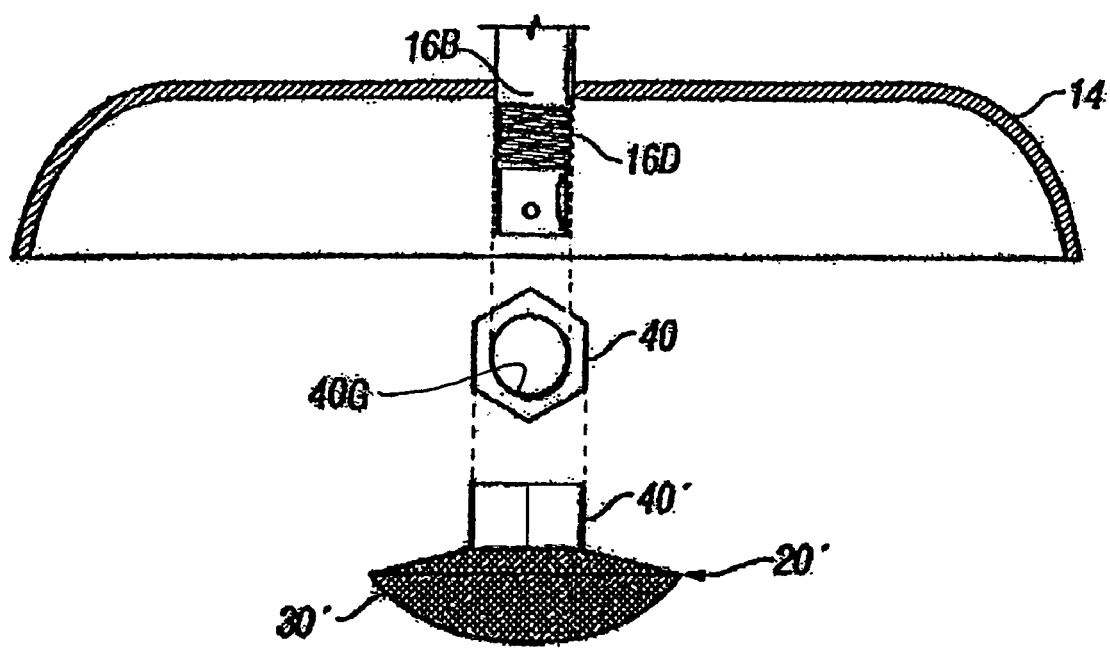
FIG. 3 shows in partial cross section how the screw safety cap attaches in the present invention.

The safety cap 20 can also be mounted on the pressure release valve by making the attachment frame 40' internally threaded at 40G, so that it is screw-engaged with a thread 16D formed on the external surface of the pressure release valve 16 as shown in FIG. 3.

By screwing the attachment frame 40' to the pressure release valve 16, the safety cap 20, like the safety cap 20 shown in FIG. 2, is attached to the pressure release valve 16 with a space between the external surface of the pressure release valve 16 and the inner surface of the safety cap 20', so that the pressure release valve 16 is not in contact with the safety cap 20' when the safety cap 20' is screwed to the pressure release valve 16.

Figure 4:
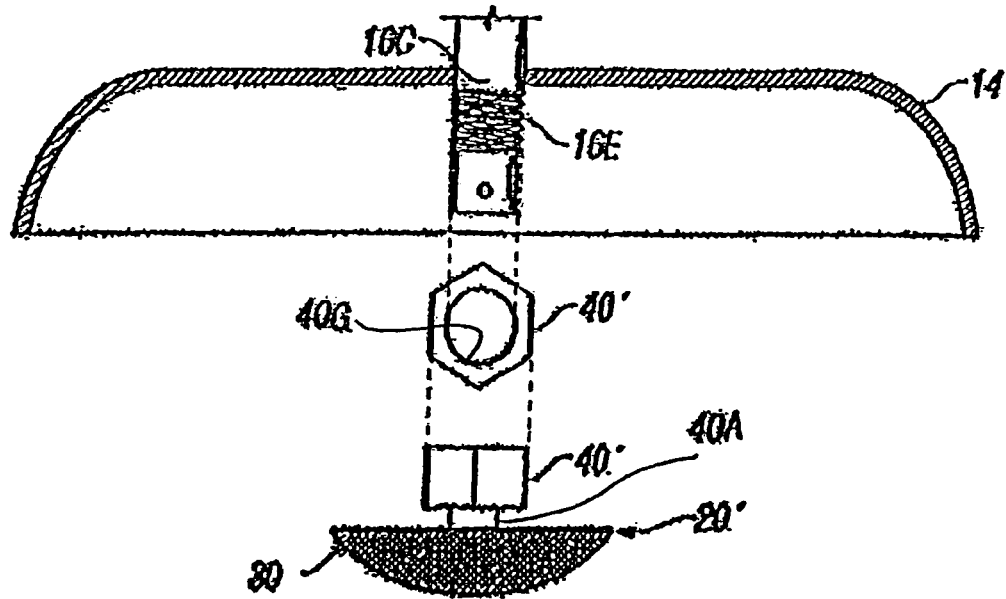
FIG. 4 shows in partial cross section how another type of screw safety cap attaches in the present invention.

In the above structure, the internally threaded attachment frame 40' is secured to the top section 30A of the mesh casing body 30. However, such an internally threaded attachment frame 40' can be secured, at a lower end of its shank portion 40A, to the bottom center of the main section 30B of the mesh casing body 30, which has no top section 30A, as shown in FIG. 4.

Figure 5:
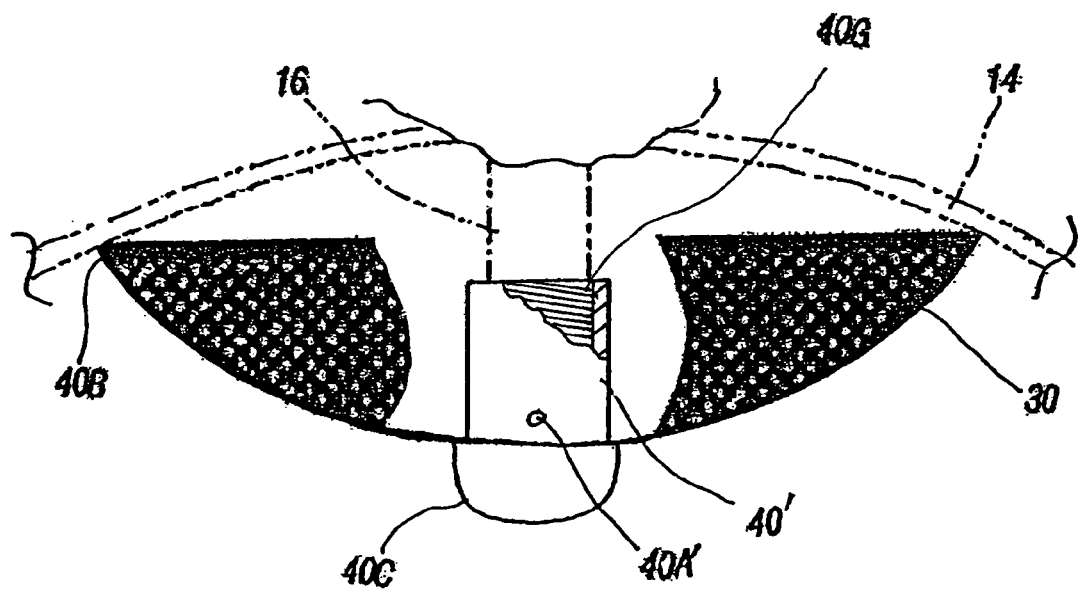
FIG. 5 is an enlarged partially cross sectional view of a still another type of screw safety cap of the present invention.

Furthermore, an attachment frame 40' that is internally threaded at 40G and substantially a hollow cylinder with no shank portion can be secured to the mesh casing body 30 as shown in FIG. 5. In this structure, the safety cap is comprised of a mesh casing body 30 that is of a substantially shallow semi-sphere (dome) shape thus having a hollow interior and a curved outer surface and an attachment frame 40' that is secured to the bottom center of the mesh casing body 30. The internally threaded attachment frame 40' is formed with an air hole(s) 40A' that communicates with the interior of the pressure release valve 16 directly or via the air intake apertures (not shown) of the pressure release valve 16 when the mesh casing body 30 is screw-fastened to the pressure release valve 16.

In FIG. 5, the reference numeral 40B is a ring-shaped reinforcing frame that is fixed to the upper edge of the mesh casing body 30 and comes into contact with the inner surface of the lid 14 when the mesh casing body 30 is mounted to the pressure release valve 16. The reference numeral 40C in FIG. 5 is a knob that is used for securing the attachment frame 40' to the mesh casing body 30 and is also used when the mesh casing body 30 is fastened to the pressure release valve 16.

As in the same manner as the safety cap shown in FIG. 3, the safety cap comprising the mesh casing body 30 is attached to the lower portion 16B (see FIG. 3) of the pressure release valve 16 when the internally threaded attachment frame 40' is screwed to the thread 16D of the pressure release valve 16. Since the mesh casing body 30 has a curved (convex) outer surface, food particles less likely adhere to the mesh casing body 30. The air intake apertures of the pressure release valve 16 is thus prevented from clogging, assuring a smooth release of the pressure inside the pressure cooker during cooking.

Figure 9:
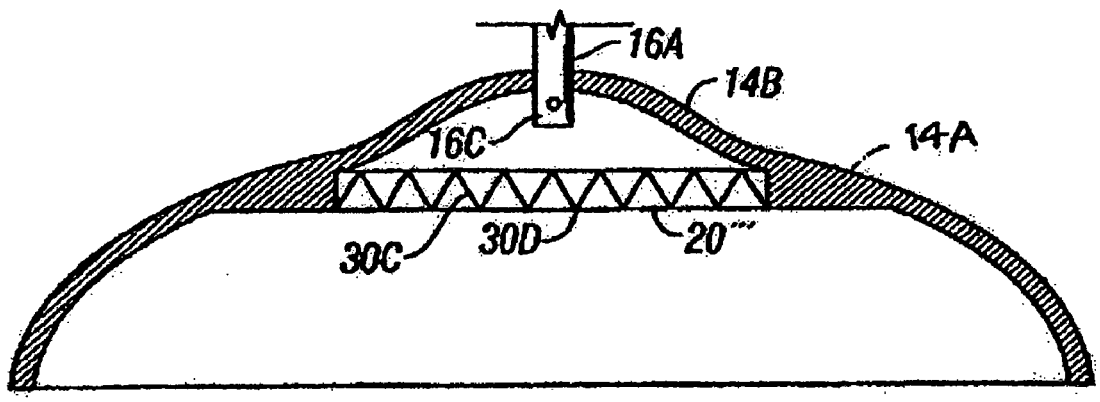
FIG. 9 shows in partial cross section how the screw safety cap with its wavy mesh casing body attaches to a specialized lid chamber in the present invention.

In the structures shown in FIGS. 8 and 9, the safety cap 20" (only a part of it is shown) is comprised of a circular attachment frame 40' and a mesh casing body 30" with its circumferential edge secured by the attachment frame 40'. The attachment frame 40' is formed on its outer circumferential surface, with an external screw thread 40s. The lid 14 of the pressure cooker is formed on its undersurface with a ring-shaped ridge 14A so that it surrounds the pressure release valve 16. The ring-shaped ridge 14A is formed on its inner circumferential surface with an internal screw thread 14s. The inner diameter of the ring-shaped ridge 14A of the lid 14 and the outer diameter of the attachment frame 40' are the same. The mesh casing body 30" has a convex shape, so it will not come in contact with the pressure release valve 16 when the safety cap 20" is attached to the lid 14.

With the structure described above, the safety cap 20" is attached to the under surface of the lid 14 by screwing the attachment frame 40' of the safety cap 20" to the ring shaped ridge 14A of the lid 14. The lower portion 16B of the pressure release valve 16 is covered by the safety cap 20", and the air intake apertures 18 of the pressure release valve 16 are prevented from clogging.

Instead of internal-thread 14s, in the structure shown in FIG. 8, the attachment frame 40" of the safety cap 20" is made of an elastic material. Attachment frame 40" has a curved outer circumferential surface, and an internal circumferential groove 14G which holds the curved outer circumferential surface of the attachment frame 40" is formed in the internal lower edge area of the ring-shaped ridge 14A of the lid 14. Attachment frame 40" fits snugly into the internal lower edge area of the ring-shaped ridge 14A of the lid 14. The attachment frame 40" of the safety cap 20" that includes the mesh casing body 30" has an outer diameter that is the same as the inner diameter of the circumferential groove 14G of the ring-shaped ridge 14A of the lid 14.

By pushing the attachment frame 40" into the circumferential groove 14G of the ring-shaped ridge 14A of the lid 14, the attachment frame 40" is snap-fitted into the circumferential groove 14G of the undersurface of the lid 14. The safety cap 20" is thereby attached to the lid 14, and the pressure release valve 16 (or the lower portion 16B having the pressure intake aperture 18) is covered by the safety cap 20".

Figure 10:
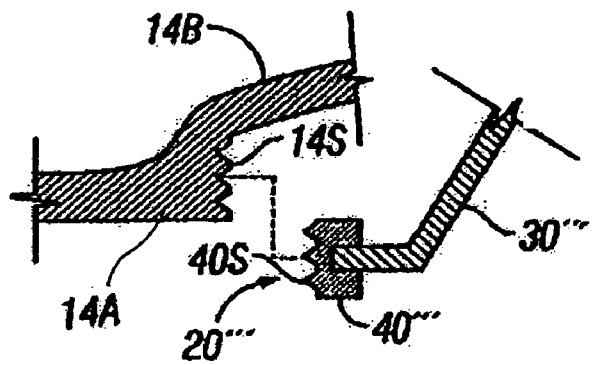
FIG. 10 shows in cross section the detail of how the screw safety cap attaches to the specialized lid chamber in the present invention.

In the structure shown in FIGS. 9 and 10, the safety cap 20''' is comprised of a circular attachment frame 40''' and a mesh casing body 30''', with its circumferential edge secured by the attachment frame 40'''. The outer circumferential surface of the circular attachment frame 40''' is made with the external thread 40s. The mesh casing body 30" is made of a wavy mesh plate comprised of numerous flat sections 30C that are connected by numerous ridge portions 30D. The lid 14 of the pressure cooker is formed with an outwardly expanding dome-shaped portion 14b with the pressure release valve 16 at the center; and an internal screw thread 14s is formed in the interior lower edge area of the dome-shaped portion 14b. The inner diameter of the interior lower edge area of the dome-shaped portion 14b of the lid 14 and the outer diameter of the attachment frame 40''' of the safety cap 20''' are the same.

The safety cap 20''' is mounted on the under surface of the lid 14 by screwing the attachment frame 40''' of the safety cap 20''' to the inside of the dome-shaped portion 14b of the lid 14. The lower portion 16B of the pressure release valve 16 is covered by the safety cap 20''', and this prevents the air intake apertures of the pressure release valve 16 from clogging. Because of its dome-shaped portion 14b, the safety cap 20''', and the mesh casing body 30''' that is formed by the wavy mesh plate, which is comprised of the numerous flat sections 30C, avoids contact with the pressure release valve 16.

Due to the ridged portions 30D, food particles are less likely to be caught by the safety cap 20''', but some of them are still caught by the flat sections 30C. The more ridges portions 30D the safety cap 20''' has, the less food particles are caught or trapped by the safety cap 20'''; consequently, the safety cap 20''' prevents itself from clogging and thus efficiently performs its intended function.

Figure 11:
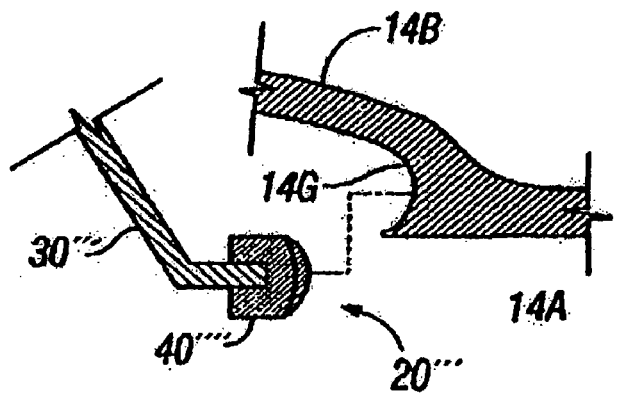
FIG. 11 shows in cross section the detail of how the snap-fit safety cap attaches to the specialized lid chamber in the present invention.

The safety cap 20''' can also be installed by a snap-fit attachment to the specialized lid chamber. More specifically, in the structure shown in FIG. 11, the attachment frame 40'''' of the safety cap 20''' is made of an elastic material. Attachment frame 40'''' has a curved outer circumferential surface, and an internal circumferential groove 14G which holds the curved outer circumferential surface of the attachment frame 40'''' is formed in the internal lower edge area of the ring-shaped ridge 14A of the lid 14. Attachment 40'''' fits snugly into the internal lower edge area of the ring-shaped ridge 14A of the lid 14. The attachment frame 40'''' of the safety cap 20''' that includes the mesh casing body 30''' has an outer diameter that is the same as the inner diameter of the circumferential groove 14G of the ring-shaped ridge 14A of the lid 14.

By pushing the attachment frame 40'''' of the safety cap 20''' into the circumferential groove 14G' of the lid 14, the attachment frame 40'''' is snap-fitted into the circumferential groove 14G'. The safety cap 20''' is thereby attached to the lid 14, and the pressure release valve 16 is covered by the safety cap 20'''.

In the illustrated structures, the attachment frame 40 (40', 40", 40''', 40'''') is in a circular shape; however, it can also take other shapes such as a square, rectangle or oval.

The safety cap 20 (20', 20", 20''') in the figures has a curved surface; however, it can also have a planar surface by making the safety cap 20 (particularly, the mesh casing body 30 (30', 30") in a pyramid or triangular pyramid.

Lastly, by making the attachment frame 40 of the safety cap 20 with a magnetic material, the safety cap 20 can be magnetically mounted to the undersurface of the lid 14. When the attachment frame 40 is made with a magnetic material such as carbon core stainless steel, then screw-mounting or snap-fit mounting are unnecessary.

The invention claimed is:

1. A pressure cooker (10) comprised of a pot (12), a fitted lid (14) and a pressure release valve (16) provided in said lid (14), a lower portion (16B) of said pressure release valve (16) located inside said lid (14) and having an air intake aperture (18) and an upper portion (16A) of said pressure release valve (16) located outside said lid (14) and having an air release nozzle, characterized in that:

said lower portion has a cylindrical portion with an external thread;

said lower portion (16B) of said pressure release valve (16) is covered with a protective device (20) that is comprised of a mesh casing body (30) and an attachment frame (40'); and wherein;

said mesh casing body (30) is a thin dome shape that has an outwardly curved, outer surface and spacedly covers said lower portion (16B) of said pressure release valve (16) and engages at a periphery thereof with an inner surface of said lid (14), said mesh casing body (30) having a plurality of openings each being equal to or smaller than air intake apertures (18) of said pressure release valve (16);

said attachment frame (40') is a substantially hollow cylinder coupled to a bottom center of said mesh casing body (30) and threadably attached to said cylindrical portion of said lower portion (16B) of said pressure release valve (16) by an internal thread of said hollow cylinder, said attachment frame (40') having at least one hole (40A') that communicates with an interior of said pressure release valve (16) and said air hole (40A') is larger than said openings in said mesh casing body (30); and a knob for securing the mesh casing body (30) to the attachment frame (40');

whereby clogging of said pressure release valve (16) and the air hole (40A') is prevented.

2. A protective device (20) for a pressure release valve (16) in a lid (14) of a pressure cooker (10), a lower portion (16B) of said pressure release valve (16) located inside said lid (14) with said lower portion (16B) having cylindrical portion with an external thread, said device (20) comprising:

a mesh case body (30) that is of a thin dome shape with an outwardly curved perforated outer surface and numerous openings and spacedly covers said lower portion (16B) of said pressure release valve (16) located inside said lid (14) and engages with an inner surface of said lid (14), a size of each of the openings of said mesh casing body being equal to or smaller than air intake of said pressure release valve (16) of said pressure cooker (10); and an attachment frame (40') of a substantial hollow cylinder which is coupled to a center bottom of said mesh casing body (30) and allows said mesh casing body (30) to be threadably attached to said cylindrical portion of said lower portion (16B) of said pressure release valve (16) by an internal thread of said hollow cylinders, said attachment frame (40') having an air hole (40A') that communicates with an interior of said pressure release valve (16) and said air hole (40A') is larger than said openings in said mesh casing body (30) and covered by said mesh casing body (30); and wherein said mesh casing body (30) is attached to said attachment frame by a knob;

whereby clogging of said pressure release valve (16) and the air hole (40A') in the attachment frame (40') is prevented.

* * * * *